ARITHMETIC CIRCUITS WITH FIELD EFFECT TRANSISTOR IN INPUT NETWORK

Filed June 28, 1968

INVENTOR.
RICHARD A. HERNDON
BY
G. Donald Weber Jr.
ATTORNEY.

United States Patent Office 3,517,178
Patented June 23, 1970

3,517,178

ARITHMETIC CIRCUITS WITH FIELD EFFECT TRANSISTOR IN INPUT NETWORK

Richard A. Herndon, Englewood, Colo., assignor to Honeywell Inc., Minneapolis, Minn., a corporation of Delaware Filed June 28, 1968, Ser. No. 741,125
Int. Cl. G06g 7/16, 7/20
U.S. Cl. 235—194 5 Claims

ABSTRACT OF THE DISCLOSURE

Arithmetic circuits including standard operational amplifiers are provided to effect multiplication and squaring. A field-effect transistor (FET) with typical FET characteristics is connected in the input network of the amplifiers.

Cross reference is made to the copending application entitled Arithmetic Circuits, by R. Herndon (the instant inventor) filed on June 28, 1968, bearing Ser. No. 741,126 and assigned to a common assignee (Case 04–3536). The cross referenced application relates to Arithmetic Circuits wherein an FET is used as an active element. However, in the cross referenced application, the control element (FET) is connected in the feedback circuit, not as the input network, of an operational amplifier.

There are many applications of arithmetic circuits in the electronic industry. These circuits are frequently used in computing systems of many types. In addition, many circuits and circuit configurations are known to effect arithmetic functions.

The subject invention uses operational amplifiers which are known in the art, More particularly, the amplifiers may be constructed of integrated circuit components such as a Fairchild 709C amplifier. In addition, typical field-effect transistors FET are utilized in conjunction with the amplifiers. However, the interconnections produce arithmetic components which are relatively simple in configuration and exhibit a high degree of reliability. As will be seen, the squaring circuit utilizes the FET in the input circuit with an impedance feedback network associated with the amplifier. In the multiplier circuit, an additional amplifier circuit is utilized with a slightly modified arrangement of the squaring circuit to provide the input to the FET wherein a predetermined input produces a multiplier circuit.

Consequently, one object of this invention is to provide arithmetic circuits.

Another object of this invention is to provide arithmetic circuits utilizing integrated circuits and field-effect transistors as the input network control elements.

Another object of this invention is to provide arithmetic circuits which operate on low level signals.

Another object of this invention is to provide arithmetic circuits having a small number of components arranged in an uncomplicated configuration.

Figure 1:
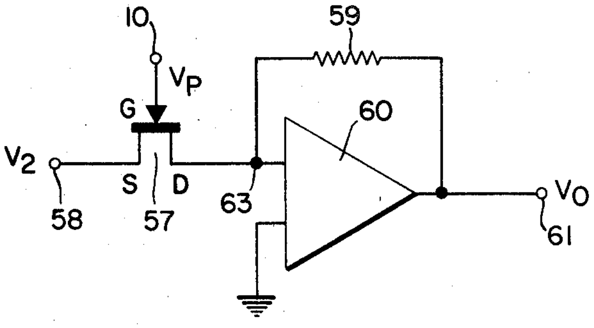
Figure 2:
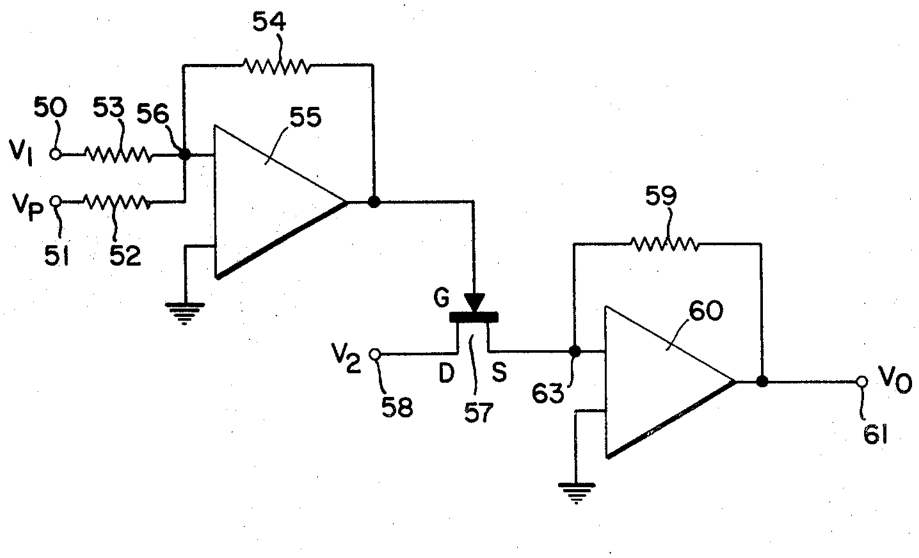

These and other objects and advantages will become more readily apparent when the following description is read in conjunction with the attached drawings, in which:

FIG. 1 is a schematic diagram of a preferred embodiment of a squaring circuit; and FIG. 2 is a schematic diagram of a preferred embodiment of a multiplier circuit.

In the figures associated herewith, similar elements bear similar reference numerals.

Referring now to FIG. 1, there is shown a schematic diagram of a squaring circuit. In the squaring circuit, the input terminal 10 is connected to the gate electrode of field-effect transistor (FET) 57. The source electrode of FET57 is connected to terminal 58 to which an input signal $V_2$ is applied. The drain electrode of FET57 is connected to summing junction 63. Summing junction 63 is connected to one input terminal of amplifier 60. Another input terminal of amplifier 60 is connected to a suitable reference source, for example ground. The output of amplifier 60 is connected to terminal 61 where the output signal $V_0$ is detected. Feedback resistor 59 is connected in parallel with amplifier 60 between the output terminal 61 and summing junction 63.

Referring now to FIG. 2, in the multiplier circuit, input signals $V_1$ and $V_p$ are supplied to input terminals 50 and 51, respectively. Input terminals 50 and 51 are connected via resistors 53 and 52, respectively, to summing junction 56. Summing junction 56 represents one input of amplifier 55. Another input of amplifier 55 is connected to ground or other suitable reference potential. The output of amplifier 55 is connected to summing junction 56 via feedback resistor 54. Amplifier 55 may be any suitable amplifier such as a Fairchild 709C unit.

The output of amplifier 55 is further connected to the gate electrode of FET57. The drain electrode of FET57 is connected to terminal 58. Input $V_2$ is applied at terminal 58. The source electrode of FET57 is connected to summing junction 63 which forms one input of amplifier 60. Another input of amplifier 60 is connected to ground or other suitable reference potential. The output of amplifier 60 is connected to summing junction 63 via feedback resistor 59. In addition, the output of amplifier 60 which may also be a Fairchild 709C or other suitable amplifier 60 is connected to output terminal 61 wherein the output signal $V_0$ is detected. Thus, the multiplier circuit of FIG. 2 has the FET connection reversed and fed by an operational amplifier relative to the squaring circuit of FIG. 1.

For the squaring circuit of FIG. 1, the transfer function is defined as $$V_0=\frac{V_2R_F}{R_{DS}}$$

wherein $R_F$ is the feedback resistor 59 and $R_{DS}$ is the drain-to-source resistance of FET57. $R_{DS}$ may be defined by the equation $$R_{DS}=\frac{V_P}{2I_{DSS}\left(\frac{V_{GS}}{V_P}-1\right)}$$

Moreover, $I_{DSS}$ equals the drain current when $V_{GS}$ is zero where $V_{GS}$ is defined as $V_p-V_2$. Substituting the equivalencies produces $$R_{DS}\cong\left(\frac{1}{V_P-V_{GS}}\right)$$

which may be rewritten as $$\frac{1}{V_P-(V_p-V_2)}$$

Setting $V_P$ equal to $V_p$, i.e., the pinch-off voltage, produces $$R_{DS}=\frac{1}{V_2}$$

Substituting in the above equation produces $V_0=V_2^2$. Thus, by operating on the equation to obtain $V_0$ equals the absolute value of $V_2^2$ to eliminate the negative sign, the transfer function for the circuit becomes $V_0=V_2^2$ wherein a squaring function is produced.

By adding the input amplifier shown in FIG. 2, the transfer function for the entire circuit produces a multiplication function. Thus, $$V_0=V_2\left(\frac{R_F}{R_{DS}}\right)$$

and $$R_{DS}=\frac{V_p}{2I_{DSS}\left(\frac{V_{GS}}{V_p}-1\right)}$$

Each of these parameters has been defined supra. Since $V_{GS}$ approximates $(V_p-V_1)$, the function $R_{DS}$ may be rewritten as $$R_{DS}\cong\frac{1}{V_P-V_{GS}}$$

or $$\frac{1}{V_P-(V_p-V_1)}$$

Setting $V_p$ equal to $V_P$, the equation reduces to $$R_{DS}=\frac{1}{V_1}$$

Substituting in the equation supra, the transfer function becomes $V_0=V_2V_1$. Thus, a multiplication of the input signals supplied to the circuit is achieved.

Thus, there have been shown and described arithmetic circuits using only operational amplifiers of the integrated circuitry type and field-effect transistors. By utilizing a field-effect transistor to operate on the input to the input of an operational amplifier, a squaring function is achieved. Additionally, by supplying a further operational amplifier which controls the input signal supplied to the field-effect transistor, a multiplying arithmetic function is achieved by the same basic circuitry. These circuits are extremely simple in configuration and are extremely reliable. By proper design of the circuit and the parameters thereof, certain proportional values or constants may be eliminated or normalized.

It is understood that those skilled in the art may conceive modifications to these circuits. However so long as the modifications and/or changes fall within the inventive concepts noted and described supra, these modifications are meant to be included in this description.

The embodiments of the invention in which an exclusive property or privilege is claimed are defined as follows:

1. An arithmetic circuit comprising
amplifier means;

input means connected to an input terminal of said amplifier means;
input signal means connected to said input means;
feedback means connected from the output terminal of said amplifier means to said input terminal of said amplifier means associated with said input means;
said input means including an active element comprising a field-effect transistor having drain, source and gate electrodes; means for supplying a control potential connected to said gate electrode of said field-effect transistor, said source and drain electrodes of said field-effect transistor being serially connected between said input signal means and said input terminal of said amplifier means.

2. The arithmetic circuit recited in claim 1 wherein said means supplying control potential to said active element comprises a source of substantially fixed voltage, said source of fixed voltage exhibiting a voltage amplitude substantially equal to the pinch-off voltage of said field effect transistor, said arithmetic circuit thereby producing an output signal proportional to the square of the signal produced by said input source means.

3. The arithmetic circuit recited in claim 1 wherein said means supplying control potential signals to said active element includes second amplifier means, said second amplifier means having at least one input source connected thereto, said second amplifier means being arranged to operate on the signal supplied thereto by each input source and being connected to supply a control signal to the gate electrode of said field-effect transistor, said arithmetic circuit thereby producing an output signal proportional to the product of the signal supplied to the input source connected to said second amplifier and the signal produced by said input signal means.

4. The arithmetic circuit recited in claim 1 wherein said feedback means comprises resistance means.

5. The arithmetic circuit recited in claim 3 wherein each of said amplifiers is substantially identical.

References Cited

UNITED STATES PATENTS

| | | | |
|---|---|---|---|
| 3,257,631 | 6/1966 | Evans | 307—304 X |
| 3,300,585 | 1/1967 | Reedyk et al. | |
| 3,368,157 | 2/1968 | Fumea et al. | |
| 3,408,571 | 10/1968 | Wilson | 307—304 X |

MALCOLM A. MORRISON, Primary Examiner

J. F. RUGGIERO, Assistant Examiner

U.S. Cl. X.R.

307—304